UNITED STATES PATENT OFFICE.

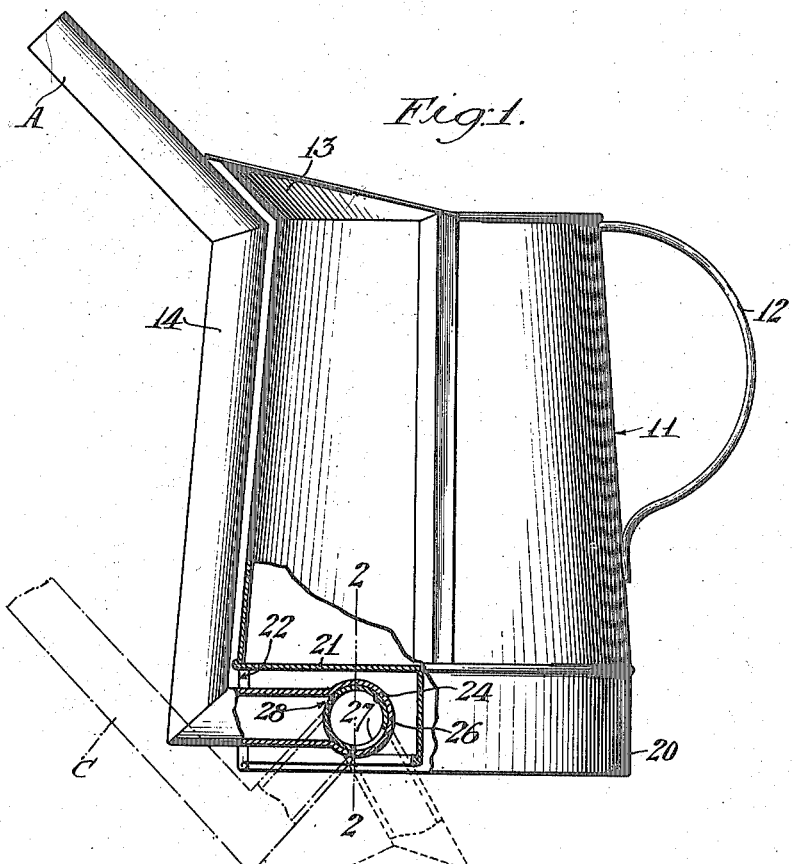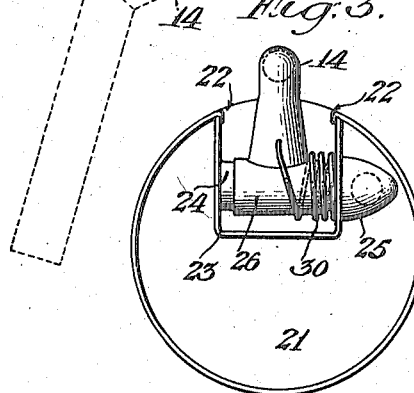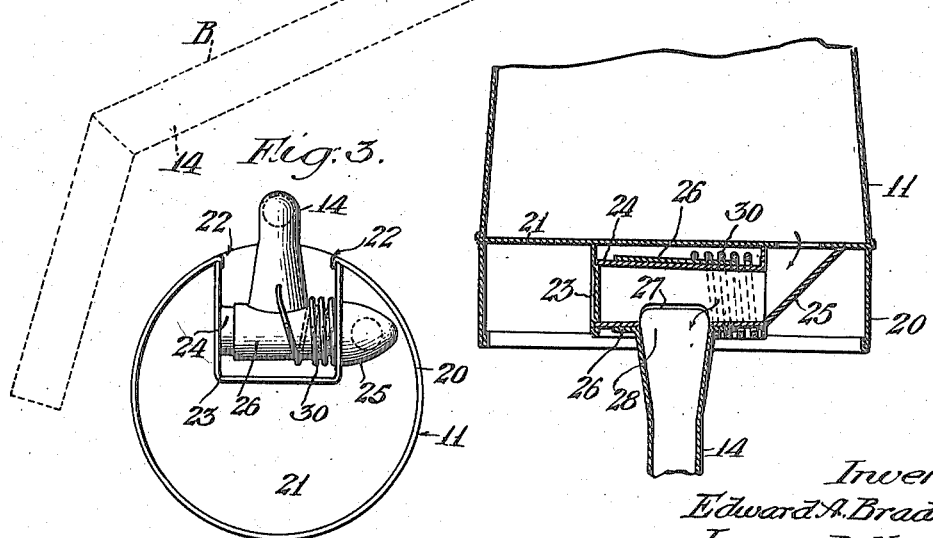

EDWARD A. BRADBURY AND JESSE D. HOYT, OF LOS ANGELES, CALIFORNIA.

MEASURING VESSEL.

1,286,517.　　　　Specification of Letters Patent.　　Patented Dec. 3, 1918.

Application filed March 14, 1918. Serial No. 222,490.

*To all whom it may concern:*

Be it known that we, EDWARD A. BRADBURY and JESSE D. HOYT, both citizens of the United States, residing at Los Angeles, in the county of Los Angeles and State of California, have invented a new and useful Improvement in Measuring Vessels, of which the following is a specification.

Our invention relates to measures such as are used for measuring liquids, and more particularly to measures which are designed and adapted to measure oil. In this country we have a large number of automobiles which require large amounts of lubricating oil, this oil being commonly purchased a quart at a time in garages and filling stations, and being placed in the automobile from a quart measure. In using the common form of measure, which is in effect a tin or copper can having a lip over which the oil is poured, certain inconveniences are met with due to the dripping of the oil from the lip and bottom of the can on the automobile. As a result it is very common to see unsightly grease stains on the highly finished surface of such automobiles due to the use of the ordinary oil measure, and the dripping oil also spoils clothing and saturates floors and woodwork, thus increasing the fire risk.

The principal object of our invention is to provide an oil measure, of simple form and construction, by which these disadvantages are avoided. This we accomplish by providing a swing spout through which the oil is delivered to the automobile without tilting the measure and without danger of spilling any of the oil. As the oil is actually measured in the measure, it is necessary that it be so constructed that it can be accurately proportioned to measure an exact amount and also so constructed that all the oil will be drained therefrom without tilting or otherwise manipulating the measure itself.

The invention consists in the novel arrangement and construction of parts as set forth more in detail hereinafter.

Further objects and advantages will be made evident hereinafter or will be evident to one skilled in the art to which this invention pertains after a perusal of the accompanying description and an examination of the drawing.

In this drawing, which is for illustrative purposes only,

Figure 1 is a side elevation partly in section of a preferred form of our invention.

Fig. 2 is a section on a plane represented by the line 2—2 of Fig. 1.

Fig. 3 is a bottom view of the measure.

In the form of our invention illustrated in these drawings, a measure 11 is shown, provided with a handle 12 and a lip 13 in accordance with standard practice. This lip is not however used in the ordinary operation of the measure to pour oil, but the oil is poured through a spout 14 which is carried in the position A, shown in full lines in Fig. 1, while the measure is being filled and transported to the automobile, and which may be swung down into the pouring position B, shown in dotted lines in Fig. 1, the oil starting to flow into the spout when the spout reaches an intermediate position C. The spout 14 has the peculiar shape shown in the drawing, fitting closely against the side of the measure to a point just below the lip 13 and following the angle of the lip thereafter when in the position A.

The measure 11 is provided with a foot rim 20 which extends down from the bottom 21, this foot rim being cut away at one side as shown at 22 in Fig. 3, and being joined at either side of the opening 22 to a spout box 23 which is approximately rectangular. Secured in oil tight relationship inside the spout box 23 is a spout tube 24 which communicates through an inclined tube 25 with the interior of the measure. The spout tube 24 is conical in shape and a spout sleeve 26 is provided having the same taper and fitting in oil tight relationship on the spout tube 24. The spout tube 24 has an opening 27 in the wall thereof and the spout sleeve 26 has a similar opening 28 registering with the interior of the spout 14, which is soldered to the sleeve 26. The openings in the sleeve 26 and the tube 24 register fully with the spout in the position B, and start to register when the spout is in the position C and are entirely out of register when the spout is in the position A.

Surrounding the tube 24 is a compression spring 30 which is so formed and placed that it tends to force the sleeve 26 tightly on the tapered tube 24 thus insuring an oil tight joint even after both the tube and sleeve have started to wear.

The method of operation of the invention is as follows:

The measure 11, with the spout in the position shown at A, is filled with oil and is carried to the automobile, the operator grasping the handle 12 and taking care not to let any portion spill out, in which the lip 13 is of assistance. It will be observed that, with the parts in the position shown in full lines in Fig. 1 or with the spout 14 in position A, it is possible to set the measure down on a horizontal flat surface without inconvenience and without spilling oil. The spring 30 is sufficiently heavy to provide considerable friction at the joint between the sleeve and the tube, which does not require a very heavy spring, as, the parts being tapered, there is a wedging action therebetween. As a result considerable force is necessary to throw the spout 14 downwardly from the position A and indeed to move the spout in either direction from any position. As a result there is no danger of the spout falling, and as the spring automatically takes up any wear on the sleeve and tube, this friction is constant over long periods. The operator can set the can down if he desires while opening the hood of the automobile below which is usually located the breather pipe into which the oil is usually poured. In many automobiles the breather pipe is quite low down and hard to reach with an ordinary oil measure, but by swinging the spout 14 down it is very easy to direct the outlet thereof directly into the breather pipe. The oil thereafter runs with considerable force and is easily controlled by varying the position of the opening 28 with relation to the opening 27.

During the pouring operation the measure is held in its upright position as shown in Fig. 1. and the oil runs out fully emptying the measure. As soon as the measure is practically empty, or before if desired, the spout is pulled up into the position A, thus shutting off the dripping of oil from the inside of the measure. By using our form of measure it is easy to fill the breather pipes of the standard forms of automobiles without dripping oil on the automobile or on the floor or clothes of the person using the measure.

It will be noted that the measure is of standard form and that our invention is merely an addition thereto, being applied to the bottom thereof. It is therefore possible to equip measures now in use with our invention without material changes in such measures, and it is possible in the manufacture of our invention to use standard measures or the tools previously used to make them without material alterations therein.

While we have heretofore stated that the oil from the measure starts to flow into the spout when the spout reaches the intermediate position C, it will be understood that sufficient time will elapse to permit the spout to be placed in the desired position before oil runs from the spout, which is due to the shape of the spout and position of the openings 27 and 28.

We claim as our invention:—

1. A measure designed to measure lubricating oil for automobiles and to facilitate the delivery of said oil to the breather pipes of said automobiles comprising a metal vessel having a flat bottom; a foot rim secured to said bottom and projecting therebelow, the lower edge of said foot rim being in a plane parallel to said bottom; a spout box formed of sheet metal and secured to said bottom inside said foot rim; a conical spout tube secured in said spout box in oil tight relationship with said spout box, said spout tube having a spout tube opening in the wall thereof; walls forming a channel connecting said spout tube with the interior of said vessel; a spout sleeve mounted on said spout tube in oil tight and movable relationship therewith, said spout sleeve having an opening in the walls thereof, so placed as to register with said spout tube opening when the measure is fully discharging; spring means for holding said spout sleeve in oil tight relationship with said spout tube; and a spout secured to said spout sleeve and connecting with said spout sleeve opening.

2. A measure designed to measure lubricating oil for automobiles and to facilitate the delivery of said oil to the breather pipe of said automobiles, comprising a vessel having a flat bottom, with an opening therein; means for supporting said vessel with said bottom a short distance above a flat surface on which the vessel sets; a spout tube connected to said opening in said bottom; means for attaching said spout tube to said bottom, said spout tube being conical in form; a spout sleeve conical in form and of the proper size and shape to fit in oil tight relationship about said tube; elastic means for holding said spout sleeve in such oil tight relationship even after considerable wear has occurred on said tube and said sleeve; and a spout secured to said sleeve, said sleeve being perforated at the point at which the spout joins thereon, and said tube being so perforated that said perforation in said sleeve is in open communication with the interior of said tube when said spout is in the pouring position.

3. A measure designed to measure lubricating oils and to facilitate the delivery of said oils to the breather pipes of automobiles comprising a vessel of the proper capacity to contain a measured amount of such oil; a flat bottom for said vessel having a bottom opening therein; a tube secured to said bottom and connected with the opening in said bottom in such a manner that any oil in the vessel has a free entrance into said tube; means for closing the end of said tube, said tube having a tube opening therein; a sleeve mounted on said tube and fitting around said tube in oil tight relationship therewith; a spout connected to said sleeve at right angles to the axis thereof; and means for supporting said vessel with its bottom parallel to and slightly above a flat surface.

4. A measure for oil or other liquids comprising a vessel of proper size and shape to hold the desired amount of liquid, said vessel having a bottom opening in the bottom thereof; a tube having an opening in the walls thereof; means for supporting said tube with its axis practically parallel to the bottom of said vessel; a spout sleeve turning on said tube in oil tight relationship therewith; said spout sleeve having an opening therein; and a spout connected to said spout sleeve and connected at its inner end to receive liquid through said spout sleeve and tube openings, but only when said spout is turned down into the pouring position.

5. A measure for oil or other liquids comprising a vessel of proper size and shape to hold the desired amount of liquid, said vessel having an outlet opening in the bottom thereof, a conical tube sleeve connected to said bottom opening and having an opening therein, a spout sleeve on the tube sleeve having an opening therein, a vertically movable spout secured to the spout sleeve, and elastic means arranged to elastically hold the spout sleeve in engagement with the tube sleeve.

6. A measure for oil or other liquids comprising a vessel of proper size and shape to hold the desired amount of liquid, said vessel having an outlet opening in the bottom thereof; a lip on the upper edge of said vessel; a foot rim on said vessel having an opening in the front portion thereof; valve means under the bottom of the vessel connected to the opening in the bottom of the vessel; and a spout connected to the valve means, said spout having a horizontally extending portion connected to the valve means extending forwardly through the opening in the foot rim, a vertical portion extending upwardly in front of the measure terminating in an outer portion extending outwardly under the lip of the vessel.

In testimony whereof, we have hereunto set our hands at Los Angeles, California, this 28th day of February, 1918.

EDWARD A. BRADBURY.
JESSE D. HOYT.